United States Patent [19]

Hölzer

[11] Patent Number: 4,522,328

[45] Date of Patent: Jun. 11, 1985

[54] SHAFT SEAL

[75] Inventor: Helmut Hölzer, Weinheim, Fed. Rep. of Germany

[73] Assignee: Firma Carl Freudenberg, Weinheim, Fed. Rep. of Germany

[21] Appl. No.: 463,438

[22] Filed: Feb. 3, 1983

[30] Foreign Application Priority Data

Feb. 6, 1982 [DE] Fed. Rep. of Germany ....... 3204193

[51] Int. Cl.³ .......................... F16K 41/00; F16J 15/00
[52] U.S. Cl. ..................................... 277/47; 277/152; 277/184
[58] Field of Search ............... 277/35, 47, 48, 206, 277/173, 174, 152, 184

[56] References Cited

U.S. PATENT DOCUMENTS

| | | | |
|---|---|---|---|
| 1,674,762 | 6/1928 | Clark | 277/35 |
| 1,893,814 | 1/1933 | Widin | 277/152 |
| 1,938,249 | 12/1933 | Fretter | 277/152 |
| 1,983,522 | 12/1934 | Coultas | 277/35 |
| 2,021,414 | 11/1935 | Gits | 277/48 |
| 2,307,152 | 1/1943 | Murray | 277/47 |
| 3,549,445 | 12/1970 | McMahon | 277/184 |
| 3,565,445 | 2/1971 | Hodges | 277/47 |

Primary Examiner—Robert I. Smith
Attorney, Agent, or Firm—Felfe & Lynch

[57] ABSTRACT

A shaft seal has an annular housing with a first and a second flange and of a hollow, frustrated cone seal ring, the apex of which is anchored liquid-tight for rotation with axial displaceably but on the shaft. The large end of the conical sealing ring forms a sealing lip which bears elastically on the inner face of the second flange which is directed toward the medium to be sealed, having essentially the shape of the frustum of a hollow. The first flange forms an annular support surface (2) which bears on the seal ring (2) between the apex shaft gripping end and the sealing lip so that the shape of the seal ring is elastically deformed.

17 Claims, 7 Drawing Figures

SHAFT SEAL

The invention relates to a shaft seal and, more particularly, one having a housing with a first and a second flange which bound an inwardly open annular groove and a seal ring, made of a polymeric material, which is anchored liquid-tight and for rotation therewith on the shaft along a gripping surface and projects to a sealing lip which bears with elastic initial tension on the second flange which is on the side of the housing toward the medium to be sealed.

A shaft seal of this type is known from German Pat. No. 16 75 397. The pressure exerted by the sealing lip on the face of the second flange is largely a function of the precision with which the two parts (housing and seal ring) are aligned relative to each other. The installation of such a shaft seal therefore is rather onerous, and even with that such a design will not meet practical requirements because in most cases there will be axial shaft displacements due to the usual bearing play.

The object of the invention is to provide a shaft seal which assures good sealing action, substantially regardless of axial and radial shaft displacements, and which can be installed as a complete unit without requiring precise adjustment.

In accordance with the invention, this object is accomplished, with a shaft seal of the type described at the outset, in that the seal ring essentially has the shape of a frustum of a hollow cone, and in that the first flange of the housing comprises an annular support surface which bears on the seal ring between the gripping surface and the sealing lip (its diameter is coordinated with the shape of the seal ring) in such a way that the latter in the installed state is elastically deformed.

The proposed shaft seal is very easy to produce and therefore can be produced very cheaply. In the simplest case, it consists of two parts which may be produced separately and merely loosely fitted together, to form a unit ready for installation. The most economical of the available manufacturing methods can therefore be selected along with the materials of construction which stand up best under the stresses arising in a particular application.

The housing may be fabricated of sheet steel or of a thermoplastic material, for example, polypropylene. The seal ring is guided not only by the shaft, as in the design according to German Pat. No. 16 75 397; but further by the support surface of the housing between the gripping surface and the sealing lip of the ring. This provides resilient pressure of the sealing lip on the face of the second flange for secondary guidance. The alignment of the sealing lip with the housing therefore is extremely stable even in the presence of axial and/or radial shaft displacements. These will be largely equalized by axial displacement of the seal ring on the shaft or axial displacement of the sealing lip. The seal ring therefore should be anchored on the shaft seal ring is held for rotation and liquid-tight, yet displaceable axially. This requirement can readily be met by coordinating the smallest diameter of the seal ring and the outside diameter of the shaft. A clearance between the largest diameter of the seal ring and the radius of the housing in the installed state will permit radial displacement of the sealing lip.

The proposed design of the seal ring permits the use of materials in its manufacture which heretofore have been regarded as lacking sufficient resilience, for example, polytetrafluoroethylene or polypropylene. Since the parts can be made very much thinner when such materials of construction are used, the seal ring will be exceptionally light in weight, with the result that covibrations with the sealed shaft are largely eliminated. Of course, the seal ring may also be made of one of the elastomeric materials which up to now have predominated in this application.

The seal ring having the shape of a frustum of a hollow cone can be manufactured in single-part production, for example, by the use of a transfer-molding process. In many cases it will be cheaper to produce it by a mechanical operation, for example, by cutting hollow frustoconical annular disks from a tube on an automatic lathe.

In one advantageous embodiment, the profile of the support surface is adapted to the profile of the seal ring and terminates in the axial direction in the manner of a skid. Mechanical damage to the seal ring during its installation or in the presence of radial and/or axial shaft motion under operating conditions is thereby prevented.

The support surface may be formed by the surface of a first slip ring made of a polymeric material. The latter is preferably selected so that a good coefficient of friction with respect to the material of the seal ring is obtained, allowance being made for wetting by the medium to be sealed.

With some materials, reliable anchoring on the housing may pose difficulties. From this point of view, it has proved advantageous to set the first slip ring into an inwardly open groove in the first flange.

It is advisable to adapt also the profile of the face of the second flange to the profile of the seal ring in the installed state. It may likewise terminate in the axial direction in the manner of a skid to prevent mechanical damage to the seal ring in the presence of radial and/or axial shaft motion. The face of the second flange may also be formed by the surface of a second slip ring made of a polymeric material. This ring also may be inserted in the groove in the housing without special measures, but it may also be bonded or clamped to the second flange to prevent leakage into the intermediate space. So far as the material of construction is concerned, it should be borne in mind that it must have as low a coefficient of friction as possible with respect to the seal ring, although motion relative to the housing should be prevented to the extent possible.

The first and/or second slip ring may be made of polytetrafluoroethylene when the seal ring is made of rubber, and of rubber when the seal ring is made of polytetrafluoroethylene. Other pairings of materials are readily possible. The section of the slip rings is preferably circular.

In one advantageous embodiment, the ratio of axial distance between gripping surface and support surface to axial distance between sealing lip and support surface ranges from 0.5 to 1.5. If said ratio is higher or lower than that range, the sealing lip may bear with insufficient force on the face of the second flange.

DESCRIPTION OF THE DRAWINGS

Exemplary embodiments of the proposed shaft seal are shown in the accompanying drawing, wherein.

DESCRIPTION OF THE PREFERRED EMBODIMENTS

Figure 1:
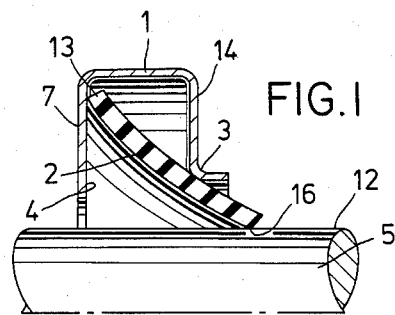
FIG. 1 is an elevation, partly in section and partly cut away, of a portion of a first preferred embodiment.

FIG. 1 illustrates an embodiment in which a sealing ring 2 having the shape of a frustum of a hollow cone is in a sheet-steel housing 1 with its smaller diameter directed toward the sealed space about shaft end 12. The smaller diameter rests around shaft 5 for liquid-tight rotation therewith but axially displacement along the sealed shaft 5. A sealing lip 13 at the larger diameter end of the sealing element 2 bears on a face 4, of a second flange 7 of the housing which is directed toward the sealed space 12. The necessary resilient contact pressure results from the deformation of the sealing ring 2 by a support surface 3 of a first flange 14 of the housing which bears on the sealing ring approximately at its midpoint.

Figure 2:
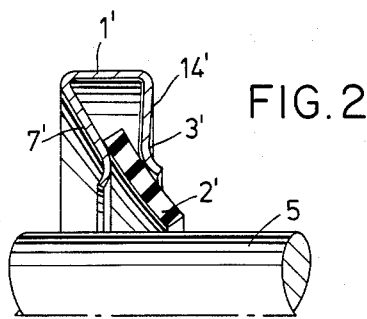
FIG. 2 is an elevation, partly in section and partly cut away, of a portion of a second preferred embodiment.

FIG. 2 shows an embodiment in which the profile of the support surface 3' of the first flange 14' and the face of the second flange 6' are adapted to the profile of the seal ring 2. With this design, mechanical damage to the seal ring due to shaft displacements is prevented.

Figure 3:
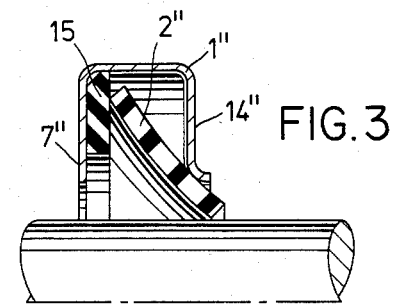
FIG. 3 is an elevation, partly in section and partly cut away, of a portion of a third preferred embodiment.

FIG. 3 shows an embodiment in which the face of the second flange 7" is provided with a friction-reducing layer 15. The latter consists of rubber and is joined to the housing 1" in a liquid-tight manner. The associated seal ring 2" is made of polytetrafluoroethylene.

Figure 4:
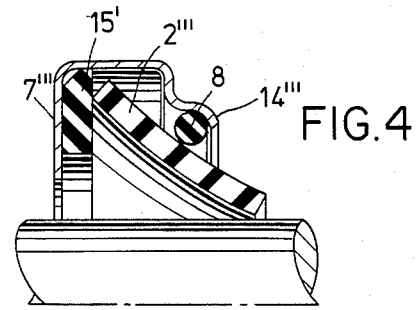
FIG. 4 is an elevation, partly in section and partly cut away, of a portion of a fourth preferred embodiment.

FIG. 4 shows an embodiment similar to that of FIG. 3 in which the support surface 15' is formed by a rubber ring having a circular section. A ring 8 replaces the support surface 3, 3'.

Figure 5:
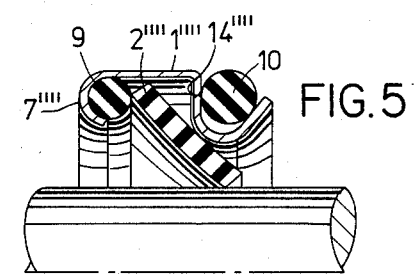
FIG. 5 is an elevation, partly in section and partly cut away, of a portion of a fifth preferred embodiment.

FIG. 5 shows an embodiment in which the layer on the face of the second flange 7"" consists of a rubber ring 9 with a circular section. In this case, too, the seal ring 2"" is made of polytetrafluoroethylene. Shown on the right in the Fig. is a groove in which an O-ring 10 is inserted to statically seal the housing 1"" against the machine element accommodating it.

Figure 6:
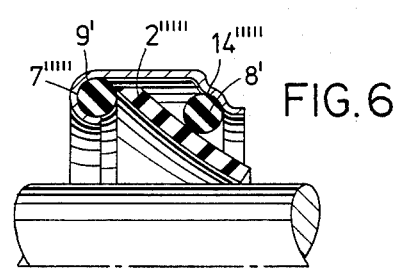
FIG. 6 is an elevation, partly in section and partly cut away, of a portion of a sixth preferred embodiment.

FIG. 6 shows an embodiment in which both the support surface of the second flange 7""" and the support surface of the first flange 14""" are formed of rings 8', 9' having a circular section. Both rings 8 and 9 are made of polytetrafluoroethylene while the seal ring 2""" is made of rubber.

Figure 7:
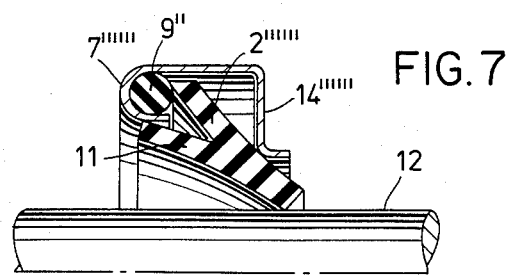
FIG. 7 is an elevation, partly in section and partly cut away, of a portion of a seventh preferred embodiment.

FIG. 7"""" shows an embodiment similar to that of FIG. 5, except that the seal ring 2 is provided, in proximity to the flange 7, with a peripheral groove and, formed thereby, an annular projection 11 which bears on the outside of the flange 7. This further contributes to the exclusion of dust and other contaminants from the sealed space 12.

I claim:

1. In a shaft seal having a housing (1) with first and second flanges (7, 14) which bound an inwardly open annular groove, and a seal ring (2) having gripping means at one end for anchoring the seal ring to the shaft (5) liquid tight and for rotation therewith when the seal ring is on the shaft and a sealing lip (13) at the other end which bears against the inner face (4) of the second flange (7) to complete the seal between the shaft (5) and housing (1), the improvement comprising:

the seal ring (2) having the shape of a frustrated hollow cone with the gripping means (16) at the small end thereof and closest to the first flange (14); and the first flange (14) of the housing (1) extending inwardly far enough for an annular support surface (3) thereof to bear against the seal ring (2) between the gripping means (16) and sealing lip (13) sufficiently to deform the seal ring elastically inwardly, whereby axial and radial vibrations of the shaft flex the seal ring against the support surface to maintain the seal at the sealing lip.

2. A shaft seal according to claim 1, wherein the gripping means (16) comprises means for allowing movement of the seal ring axially of the shaft when the seal ring is on the shaft.

3. A shaft seal according to claim 2, wherein the profile of the support surface (3) forms a skid to the profile of the seal ring (2).

4. A shaft seal according to claim 3, wherein the support surface (3) is a first slip ring (8) on the first flange of the housing.

5. A shaft seal according to claim 4, wherein the housing has a groove into which the first slip ring (8) is set.

6. A shaft seal according to claim 4, wherein the first slip ring has a circular profile forming the skid.

7. A shaft seal according to claim 4, wherein one of the first slip ring and the seal ring is made from rubber and the other from polytetrafluoroethylene.

8. A shaft seal according to claim 2, wherein the profile of the face (4) of the second flange (7) forms a skid to the profile of the seal ring (2).

9. A shaft seal according to claim 8, wherein the face (4) is a second slip ring (9) on the housing.

10. A shaft seal according to claim 9, wherein the housing has a groove into which the second slip ring is set.

11. A shaft seal according to claim 9, wherein one of the second slip ring and the seal ring is made from rubber and the other from polytetrafluoroethylene.

12. A shaft seal according to claim 2, wherein the ratio of the axial distance between gripping surface (16) and support surface (3) to the axial distance between sealing lip (13) and support surface (3) ranges from about 0.5 to about 1.5.

13. A shaft seal according to claim 2, wherein the seal ring (2) has a peripheral groove about the sealing lip (13) for forming an annular projection (11) which also bears on the second flange (7).

14. A shaft seal according to claim 1, wherein the profile of the support surface (3) forms a skid to the profile of the seal ring (2).

15. A shaft seal according to claim 1, wherein the profile of the face (4) of the second flange (7) forms a skid to the profile of the seal ring (2).

16. A shaft seal according to claim 1, wherein the ratio of the axial distance between gripping surface (16) and support surface (3) to the axial distance between sealing lip (13) and support surface (3) ranges from about 0.5 to about 1.5.

17. A shaft seal according to claim 1, wherein the seal ring (2) has a peripheral groove about the sealing lip (13) for forming an annular projection (11) which also bears on the second flange (7).

* * * * *